(12) United States Patent
Shaffer et al.

(10) Patent No.: US 8,838,078 B2
(45) Date of Patent: Sep. 16, 2014

(54) INTELLIGENT TELEPHONE NUMBER PROCESSING

(75) Inventors: Joshua H. Shaffer, San Jose, CA (US); Jeremy Thomas Brown, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/225,204

(22) Filed: Sep. 2, 2011

(65) Prior Publication Data

US 2012/0307991 A1 Dec. 6, 2012

Related U.S. Application Data

(60) Provisional application No. 61/493,388, filed on Jun. 3, 2011.

(51) Int. Cl.
*H04M 3/42* (2006.01)

(52) U.S. Cl.
USPC .................................. 455/414.1; 379/355.08

(58) Field of Classification Search
USPC ................................................. 455/566, 410
See application file for complete search history.

(56) References Cited

U.S. PATENT DOCUMENTS

| 5,241,589 | A | 8/1993 | Jefferson |
| 5,475,743 | A | 12/1995 | Nixon et al. |
| 5,946,618 | A | 8/1999 | Agre |
| 6,782,278 | B2 | 8/2004 | Chen et al. |
| 6,941,159 | B2 | 9/2005 | Tsai et al. |
| 7,715,829 | B2 | 5/2010 | Li et al. |
| 2002/0160815 | A1 | 10/2002 | Patel et al. |
| 2004/0204117 | A1 | 10/2004 | Weiner |
| 2005/0176411 | A1* | 8/2005 | Taya et al. .................. 455/414.1 |
| 2006/0046785 | A1 | 3/2006 | Cagney |
| 2006/0094353 | A1 | 5/2006 | Nielsen et al. |
| 2006/0140384 | A1 | 6/2006 | Plunkett et al. |
| 2006/0177043 | A1 | 8/2006 | Li et al. |
| 2007/0129959 | A1 | 6/2007 | Bransky et al. |
| 2008/0043718 | A1 | 2/2008 | Chu |
| 2008/0167083 | A1* | 7/2008 | Wyld et al. .................... 455/566 |

(Continued)

FOREIGN PATENT DOCUMENTS

| EP | 1441557 A2 | 7/2004 |
| EP | 1505805 A1 | 2/2005 |

(Continued)

OTHER PUBLICATIONS

International Search Report mailed Aug. 23, 2012 in PCT Application No. PCT/US12/39466, 3 pages.

(Continued)

*Primary Examiner* — Maria El-Zoobi
(74) *Attorney, Agent, or Firm* — Kilpatrick Townsend & Stockton LLP

(57) ABSTRACT

A method and apparatus of a device that converts a telephone number based on the location of a telephone is described. The device receives the telephone number, where telephone number is to be used to place a telephone call on the device. The device further determines if the telephone number is suitable to place the telephone call based on a content of the telephone number and a location of the device. If the telephone number is not suitable to place the telephone call, the device converts the telephone number to a telephone number suitable to be used to place the telephone call.

19 Claims, 11 Drawing Sheets

(56) References Cited

U.S. PATENT DOCUMENTS

| | | | |
|---|---|---|---|
| 2008/0292092 A1* | 11/2008 | LaPorte et al. | 379/355.08 |
| 2009/0034705 A1 | 2/2009 | Janssen | |
| 2010/0146639 A1 | 6/2010 | Kim et al. | |
| 2010/0157986 A1 | 6/2010 | Rao et al. | |
| 2011/0044438 A1 | 2/2011 | Wang et al. | |
| 2011/0044443 A1 | 2/2011 | Dai | |
| 2011/0143711 A1* | 6/2011 | Hirson et al. | 455/410 |
| 2011/0158396 A1* | 6/2011 | Eichen et al. | 379/229 |

FOREIGN PATENT DOCUMENTS

| | | |
|---|---|---|
| EP | 1659817 A2 | 5/2006 |
| EP | 2299666 A2 | 3/2011 |
| JP | 2001-119750 A | 4/2001 |
| JP | 2003-333165 | 11/2003 |
| KR | 10-2006-0024263 A | 3/2006 |
| KR | 10-0960248 | 6/2010 |
| WO | 2004/021723 A1 | 3/2004 |
| WO | WO2005/096603 A1 | 10/2005 |

OTHER PUBLICATIONS

European Search Report mailed Nov. 27, 2012 in EP Application No. 12170364.9, 6 pages.

Office Action mailed May 1, 2013 in Japanese Patent Application No. 2012-138205, English Translation, 4 pages.

Office Action mailed Jul. 19, 2013 in U.S. Appl. No. 13/457,863, 16 pages.

Office Action mailed Jan. 16, 2013 in U.S. Appl. No. 13/457,863, 16 pages.

International Search Report mailed Jul. 11, 2013 in PCT/US2013/035771, 10 pages.

English Translation of Office Action mailed Jul. 30, 2013 in KR 10-2012-59333, 4 pages.

* cited by examiner

US 8,838,078 B2

INTELLIGENT TELEPHONE NUMBER PROCESSING

RELATED APPLICATIONS

Applicant claims the benefit of priority of prior, provisional application Ser. No. 61/493,388, filed Jun. 3, 2011, the entirety of which is incorporated by reference.

FIELD OF INVENTION

This invention relates generally to address processing and more particularly to processing telephone numbers.

BACKGROUND OF THE INVENTION

There are different types of telephone numbers that can be used to place a telephone call depending on the geographical location of the telephone receiving the call. A local number requires the least number of digits in the telephone number and can be used to make a local telephone call. For example, in the United States, a local number is composed of seven digits. Telephone calls to areas of a country outside the local calling area will require an area code in addition to the local number. Telephone calls made between countries require further prefixes to the telephone number, such as an international prefix and a country code.

In today's modern telephone, a telephone number can be stored for easy retrieval (e.g., an address book). The telephone number that is stored can be a local number, long distance number, or international number. Whether this stored telephone number can be successfully used to place a telephone call depends in part of the geographical location of the telephone with the stored telephone number. For example, if a stored telephone number is a local number and the telephone has roamed to a different geographically area of the home country associated with the telephone or to a different country, the stored local telephone number will not work.

SUMMARY OF THE DESCRIPTION

A method and apparatus of a device that converts an input telephone number based on the location of a telephone is described. In an exemplary embodiment, the device receives the input telephone number, where input telephone number is to be used to place a telephone call on the device. The device further determines if the input telephone number is suitable to place the telephone call based on a content of the input telephone number and a location of the device. If the input telephone number is not suitable to place the telephone call, the device converts the telephone number to a telephone number suitable to be used to place the telephone call.

In a further embodiment, a machine-readable medium has executable instructions to cause one or more processing units to perform a method of processing an input telephone number. In one embodiment, the method comprises receiving the input telephone number, where the input telephone number to be used to place a telephone call on a telephone and the input telephone number include a prefix. The method further removes the prefix from the input telephone number and determines a matching rule for input telephone number based on the location of the telephone. In addition, the method applies the matching rule to the input telephone number to create a converted telephone number that is suitable to place a telephone call.

In another embodiment, a machine-readable medium has executable instructions to cause one or more processing units to perform a method of processing an input telephone number. In one embodiment, the method comprises receiving the input telephone number, where the input telephone number to be used to place a telephone call on a telephone. Furthermore, the method determines if the input telephone number is suitable to place the telephone call based on a content of the input telephone number and a location of the telephone. If the input telephone number is not suitable to place the telephone call, the method converts the input telephone number to a converted telephone number that is suitable to be used to place the telephone call.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1A:
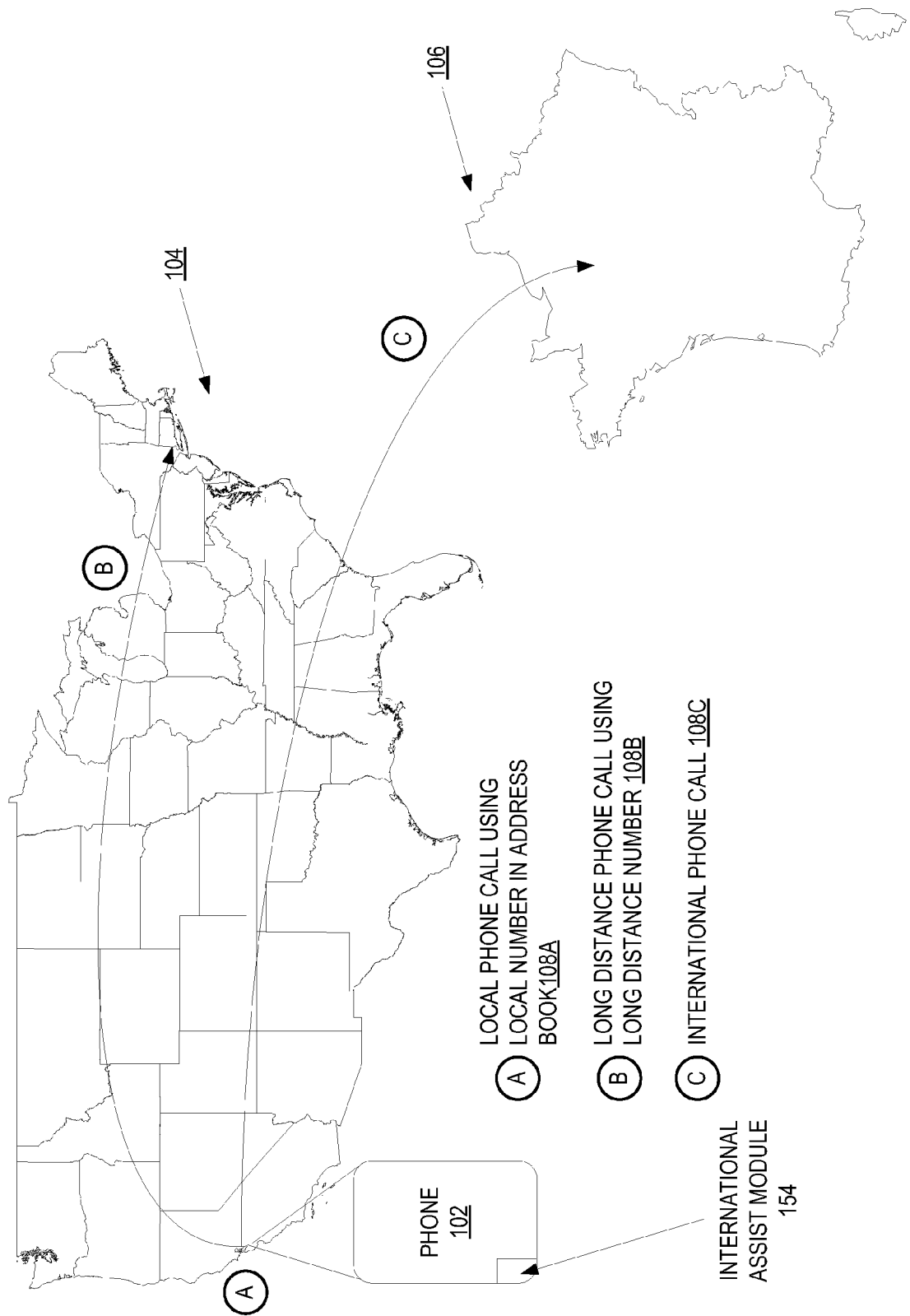
FIG. 1A is a block diagram of one embodiment of system that is used to make local, long distance, and international telephone calls.

A method and apparatus of a device that converts a telephone number based on the location of a telephone is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that converts a telephone number based on the location of a telephone is described. The device receives the telephone number, where telephone number is to be used to place a telephone call on the device. The device further determines if the telephone number is suitable to place the telephone call based on a content of the telephone number and a location of the device. If the telephone number is not suitable to place the telephone call, the device converts the telephone number to a telephone number suitable to be used to place the telephone call.

A method and apparatus of a device that converts a telephone number based on the location of a telephone is described. In an exemplary embodiment, the device receives the telephone number from a recents list entry, an address book entry, or a telephone Uniform Resource Locator (URL). The device analyzes the telephone number to determine if the telephone number is suitable to place a telephone call based on the content of the telephone number and the location of the device. For example and in one embodiment, the device determines if the telephone number is not a fully qualified telephone number. In another embodiment, the device determines if the telephone number is not consistent with the location of the device. If the telephone number is not suitable to place a telephone call, the device converts that telephone number into a telephone number that is suitable to place a telephone call.

In one embodiment, the device converts the telephone number by removing an international and/or domestic prefix from the input telephone number. The device further determines a matching rule that is used to convert the input telephone number after the prefix(es) are removed. The device applies the matching rule.

FIG. 1A is a block diagram of one embodiment of telephone 102 that is used to make local, long distance, and international telephone calls. In FIG. 1A, telephone 102 is able to make telephone calls using different types of the telephone numbers. Telephone 102 may be a cellular telephone, smartphone, wireless telephone, etc., and/or any other device that can make telephone calls. In one embodiment, the telephone 102 can make a local telephone call 108A using the local telephone number. In this embodiment, the local telephone number is one that includes the minimum number of digits for a local telephone number, but does not include the other possible components of a telephone number, such as an area code, country, carrier code, international prefix, and/or other type of telephone number component as known in the art.

In one embodiment, the local telephone number is used to dial the telephone call 108A can be a locally formatted telephone number that is stored in a an address book, stored in a "Recents" list of recently dialed telephone numbers, received from another application via a telephone Uniform Resource Locator (URL), input to the telephone dialer by a user of the telephone, and/or another mechanism as known in the art. As is known in the art, a local telephone number format depends on the local country for the local number. For example and in one embodiment, a local telephone number has a format of XXX-XXXX in the United States, XX XX XX XX in France, etc.

In another embodiment, the telephone 102 can make a long distance telephone call 108B using the long distance telephone number. In this embodiment, the long distance telephone number is one that includes an area code plus the local number, but does not include the other possible components of a telephone number, such as the country code, carrier code, international prefix, and/or other type of telephone number component as known in the art. The long distance telephone number is used to dial the telephone call 108B can be a long distance formatted telephone number that is stored in the address book, "Recents" list, received from another application via a telephone URL, input to the telephone dialer by a user of the telephone, and/or another mechanism as known in the art. As is known in the art, a long distance telephone number format depends on the local country for the long distance number. For example and in one embodiment, a long distance telephone number has a format of XXX-XXX-XXXX in the United States, X XX XX XX XX in France, etc.

In a further embodiment, the telephone 102 can make an international telephone call 108C using the international telephone number. In this embodiment, the international telephone number is one that includes an international prefix, country code, area code plus the local number. The international telephone number is used to dial the telephone call 108C can be an international formatted telephone number that is stored in the address book, "Recents" list, received from another application via a telephone URL, input to the telephone dialer by a user of the telephone, and/or another mechanism as known in the art. For example and in one embodiment, a long distance telephone number has a format of +1-XXX-XXX-XXXX in the United States, 011 33 X XX XX XX XX in France, etc.

In one embodiment, a problem with using telephone numbers that are stored on the telephone (e.g., address book entries, "Recents" list entries, etc.) or made available to the telephone (telephone URL, etc.), is that these telephone numbers may not be formatted properly or include the necessary information to successfully make the telephone call for the geographic location the telephone currently resides in. For example, if a telephone is roams to a different geographical area (e.g., different part of the country that is the home country for the telephone, a different country that the home country for the telephone, etc.), a local or long distance telephone number that is stored or provided to the telephone may not include the necessary information to successfully place the telephone call. For example and in one embodiment, the address book entry that is a local number used to make a local telephone call 108A would not work if the telephone 102 roamed from country 104 to country 106. As another example, a Recents list entry that is an area code plus local number used to make a long distance telephone call 108B would also not work if the telephone 102 roamed from country 104 to country 106.

Figure 1B:
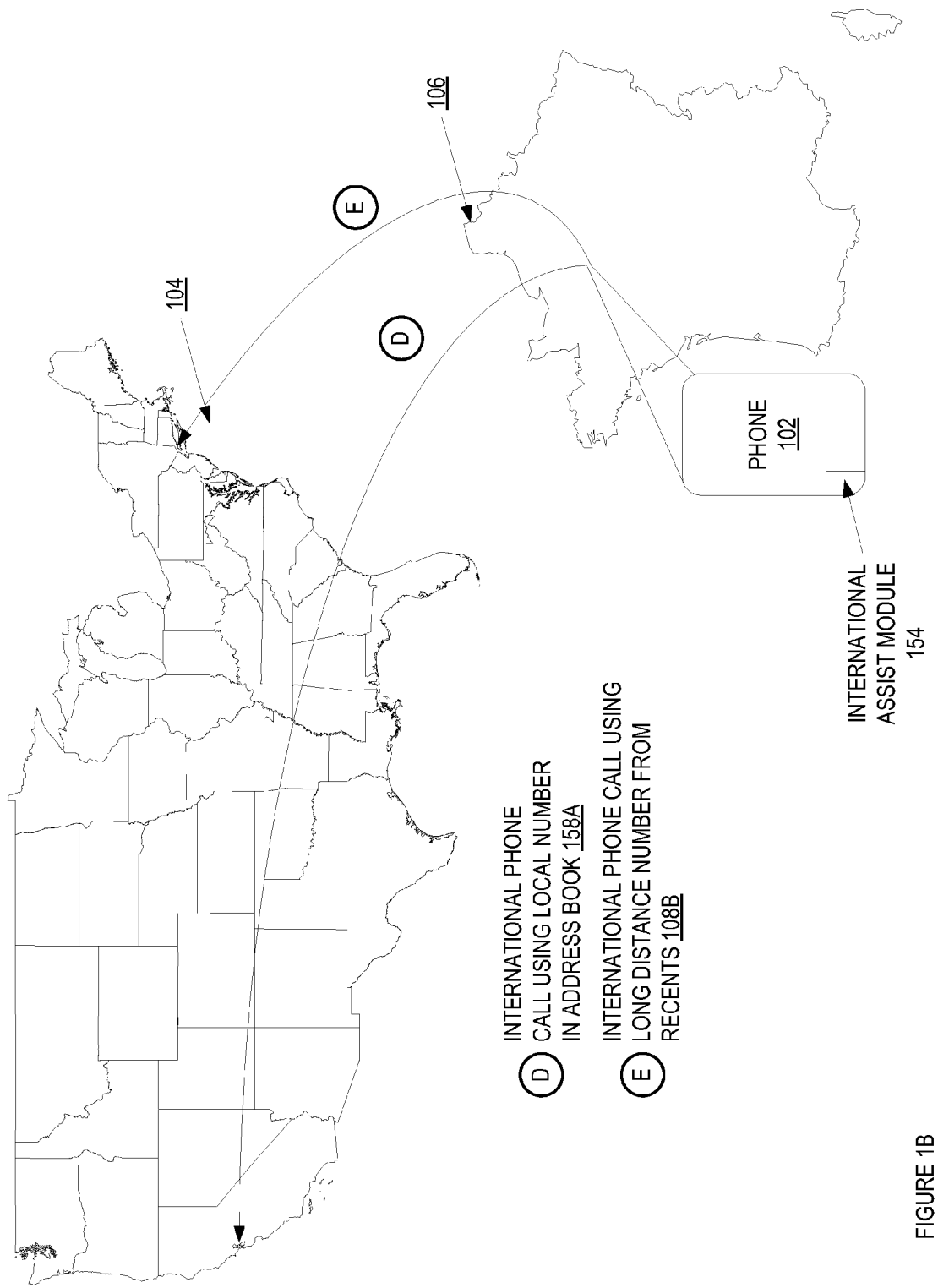
FIG. 1B is a block diagram of one embodiment of system that is used to perform international assist in making international telephone calls using telephone numbers stored in recents and address books.

In one embodiment, telephone 102 includes an international assist module 154 that is used to correct a local, long distance, or another type of telephone number that may not be proper to successfully place a telephone call. FIG. 1B is a block diagram of one embodiment of telephone 102 that is used to perform international assist in making international telephone calls using telephone numbers stored in recents and address books. In FIG. 1B, telephone 102 has roamed from country 104 to country 106 and country 104 is the home country for the telephone 102. In one embodiment, a home country for a telephone is the country associated with the initial telephone service of the telephone 102. For example and in one embodiment, for a telephone that has its cellular telephone service in the United States, the home country for that telephone is the United States. In another embodiment, the home country can be multiple countries or sections of countries, depending on how a telephone carrier service is organized. Because the telephone 102 has roamed to a geographical area outside the telephone 102 home country, the stored or provided telephone numbers may not work. In this embodiment, the international assist module 154 receives the telephone number and converts that received telephone number into a new telephone number that will be able to place the telephone call. In one embodiment, a roaming telephone is a telephone that is outside of the geographical region that serves by the home carrier of the telephone.

For example and in one embodiment, the telephone 102 will attempt to make an international telephone call 158A using a local number that is stored in the address book. The international assist module 154 will add the area code, country code, and international prefix to the local number to create a fully qualified telephone number and pass this number to a telephone module that places the telephone call. In one embodiment, the telephone 102 will be able to complete a telephone call using a fully qualified telephone number in country 106. In another embodiment, a fully qualified telephone number may not work in countries such as Brazil or Japan. In this embodiment, the international assist module 154 would apply different rules so as to convert a telephone number into one proper for these locations.

In another embodiment, the telephone 102 includes a domestic assist module (not shown) that can used to rewrite a telephone number to fix invalid telephone numbers for domestic telephone calls. For example and in one embodiment, the domestic assist module can identify that a telephone number includes an international prefix, country code, domestic prefix, area code, and local number. In this embodiment, the domestic assist module would drop the domestic prefix to give a fully qualified telephone number. In another embodiment, the domestic assist module would identify a telephone number as having a leading country code and area code, but no international prefix. In this embodiment, the domestic assist module would prepend the international prefix to the telephone number.

In one embodiment, the domestic assist module uses a set of rules for the current country to determine if there is a match between a pattern in one of the rules and the telephone number. An example of a rule is that an eleven character United State telephone is to begin with a "1." In another embodiment, the domestic assist module can add one or more characters to a telephone number to see if there is a match. For example and in one embodiment, the domestic assist module adds a "+" to a telephone number to see if there is a match to one of the rules for that country.

Figure 2A:
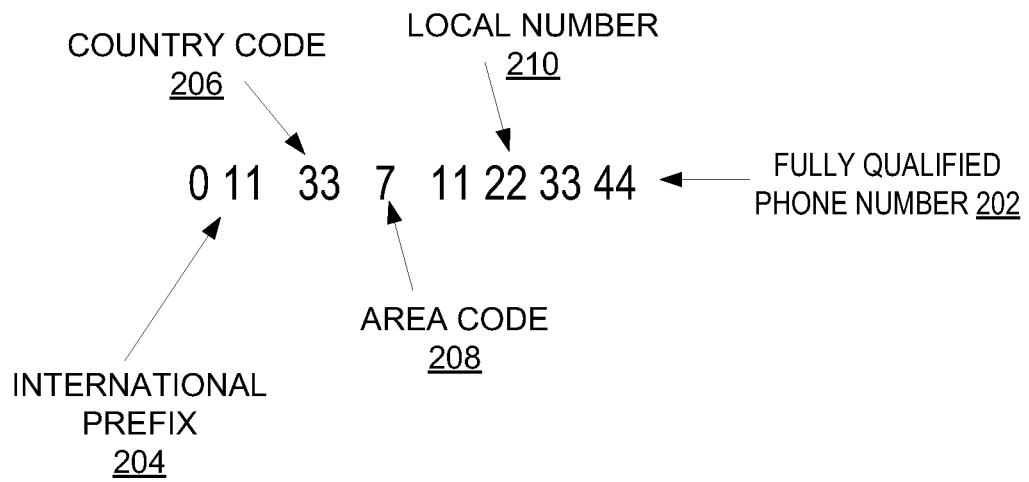
FIG. 2AB is are block diagrams of embodiments of fully and non-fully qualified telephone numbers.
Figure 2B:
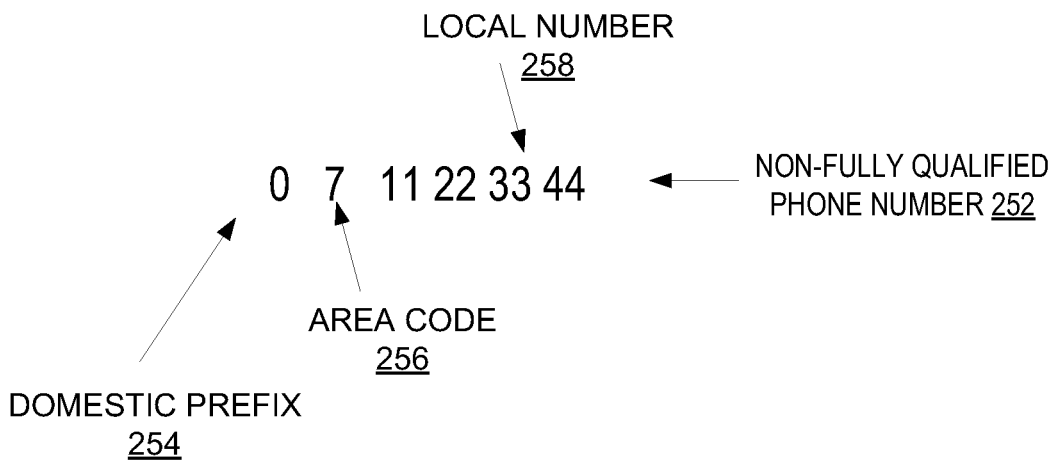

FIG. 2AB is are block diagrams of embodiments of fully 202 and non-fully qualified telephone numbers 252. In FIG. 2A, a fully qualified telephone number 202 comprises international prefix 204, country code 206, area code 208, and local number 210. In one embodiment, the international prefix 204 is a 1-3 character code that is used to access other countries. For example and in one embodiment, an international prefix can be "011", "00", "+", etc. A country code 206 is 1-4 numeric code that designates which country that telephone number is for. For example and in one embodiment, a country code can be "1," "44," "33," "91," etc. An area code 208 usually indicates a geographical area of a country the telephone is associated with (or associated with at one time, in the case of a mobile phone). The local number 210 is telephone number that uniquely identifies the telephone assigned this local number within the local area. In one embodiment, the fully qualified telephone number 202 can be successfully dialed from any geographical location, including a geographic location that is local to the telephone number being dialed. In another embodiment, a fully qualified telephone number may not work in countries such as Brazil or Japan.

In contrast, a non-fully qualified telephone number 252 does not have all of the different components that the fully qualified telephone number 202 and/or have additional components. For example and in one embodiment, the non-fully qualified telephone number 252 includes domestic prefix 254, area code 256, and local number 258. In this embodiment, non-fully qualified telephone number 252 does not include the international prefix or country code. In addition, the non-fully qualified telephone number 252 can include components that are not present in the fully qualified telephone number 202. For example and in one embodiment, the non-fully qualified telephone number 252 can include the domestic prefix 254 that is used to access a national telephone system. In another embodiment, the non-fully qualified telephone number 252 can include a carrier code (not shown) that is used to designate a particular carrier in a national telephone system. A non-fully qualified telephone number 252 may be used to make calls that are local or within the same country that the telephone is geographically situated. In an alternate embodiment, the non-fully qualified telephone number 252 may include the local number 258 or the local number 258 and the area code 256.

Figure 3:
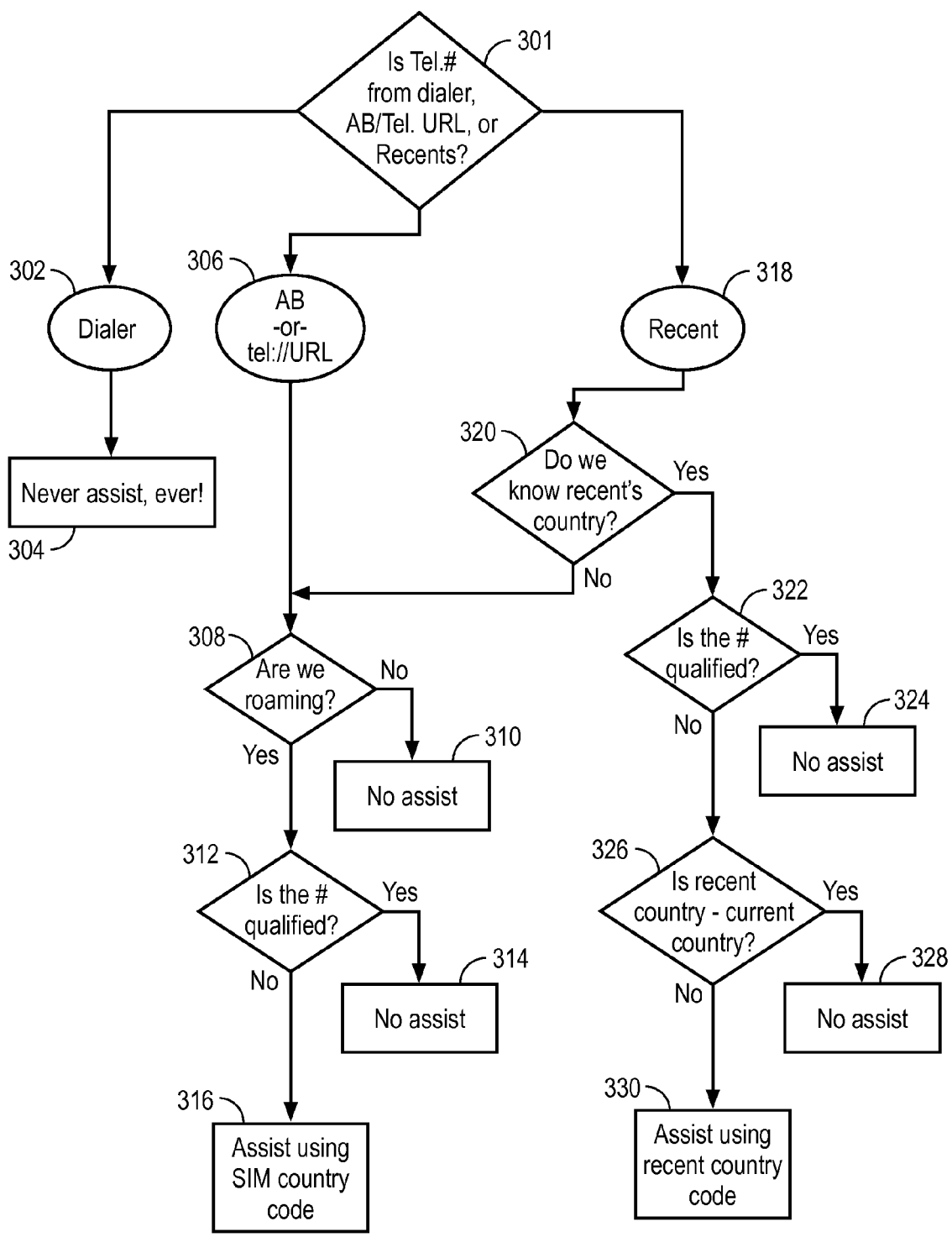
FIG. 3 is a flow diagram of one embodiment of a process to use international assist for telephone calls from the dialer, using an address book entry or telephone URL, or using a recents list.

FIG. 3 is a flow diagram of one embodiment of a process 300 to use international assist for telephone numbers received from the dialer, an address book entry or telephone URL, or a Recents list entry. In FIG. 3, process 300 begins by receiving the telephone number and further decides how to process the telephone number at block 301. In one embodiment, if the telephone number is from the dialer, process 300 proceeds to block 302 in order to process the telephone number for the dialer. In one embodiment, the dialer is a component of the telephone that is used to receive a telephone number from a user (e.g., entered on a physical or virtual numeric keypad). If the telephone number is received from the address book or in the form of a telephone URL, process 300 proceeds to block 306 for additional processing in blocks 306-316. In one embodiment, an address book is used to store commonly used telephone numbers (e.g., a list of know contacts, favorites, etc.). In another embodiment, a telephone URL may be used to communicate a telephone number from another application running on the telephone to process 300. For example and in one embodiment, process 300 may receive a telephone URL from a web browser. In this example, a user may activate a link on a web page in the web browser that causes a telephone URL to be sent to process 300. This example can occur if a telephone number is displayed on a web page and the web browser formats the telephone number to be displayed as a link to the telephone URL. In a further embodiment, if the telephone number is received from the Recents list, process 300 proceeds to block 318 for additional processing in blocks 318-330.

At block 302, process 300 begins by processing the received telephone number from the dialer. In one embodiment, process 300 does not perform international assist on a telephone number. In this embodiment, process 300 does not perform international assist because if the user is typing the phone number into the dialer, the assumption is that the user is dialing telephone number correctly for their current location. For example and in one embodiment, a user may dial a short number (e.g., 511) or an emergency number (e.g., 211, 911, etc.). In another embodiment, process 300 performs international assist on a telephone number received from the dialer.

If the telephone number was received from an address book entry or a telephone URL, process 300 begins by processing the received telephone number at block 306. At block 308, process 300 determines if the telephone is roaming. In one embodiment, a roaming telephone is a telephone that is outside of the geographical region that is served by the home carrier of the telephone. For example and in one embodiment, process 300 compares the carrier currently serving the telephone and the home carrier to determine if the telephone is roaming. If the telephone is not roaming (e.g., the current carrier is the home carrier), process 300 does not perform international assist on the telephone number at block 310.

If the telephone is roaming, process 300 determines if the telephone number is a fully qualified telephone number at block 312. In one embodiment, process 300 determines if the telephone number is a fully qualified telephone number by determining if the telephone number is formatted with a recognized international prefix, followed by a country code, followed by an area code and local number consistent with the country code. For example and in one embodiment, a French telephone number that is "011 33 7 11223344" is a fully qualified telephone number and a French telephone number that is "0 7 11223344" is not a fully qualified telephone number.

If the telephone number is a fully qualified telephone number, process 300 does not perform international assist at block 314. In one embodiment, process 300 does not perform international assist because a fully qualified telephone number may be usable in any geographical region the telephone may be in.

If the telephone number is not a fully qualified telephone number, process 300 performs international assist using the country information stored in the phone at block 316. In one embodiment, process 300 performs international assist by removing the telephone prefixes (if present), finding a matching rule for the telephone number, and applying the matching rule. Performing international assist is further described in FIG. 4 below.

If the telephone number was received from a Recents list entry, process 300 begins by processing the received telephone number at block 318. At block 320, process 300 determines if process 300 knows the country associated with the Recents list entry. In one embodiment, process 300 determines if the telephone number includes a country code. For example and in one embodiment, a country code is stored away at the time the call is made. This country code allows process 300 to know where the telephone was when that call was made. In another embodiment, process 300 attempts to determine country information by matching the recents number to address book entry or web page, and extracts country information stored with the telephone number. For example and in one embodiment, an address may be associated in an address book entry, or an address may be in a web page with the telephone number. If the Recents list entry does not have associated county information, process 300 proceeds to block 308 above.

If the Recents list entry telephone number does have associated country information, process 300 determines if this telephone number is a fully qualified telephone number at block 322. In one embodiment, process 300 determines if the telephone number is a fully qualified telephone number as described in FIG. 3, block 312 above. If the telephone number is a fully qualified telephone number, process 300 does not perform international assist at block 324.

If the telephone number is not a fully qualified telephone number (e.g., a non-fully qualified telephone number), process 300 determines if the country determined at block 320 above is the current country the telephone is located in at block 326. While in one embodiment, process 300 determines the current country based on the current carrier of the telephone, in alternate embodiments, process 300 determines the current country in a different fashion (e.g., Global Positioning System (GPS), street address in address book entry, etc.). If the Recents country is the same as the current country, process 300 does not perform international assist at block 328. If the Recents country is different from the current country, process 300 performs international assist of the telephone number using the Recents country information at block 330. In one embodiment, process 300 performs international assist by removing the telephone prefixes (if present), finding a matching rule for the telephone number, and applying the matching rule. Performing international assist is further described in FIG. 4 below.

Figure 4:
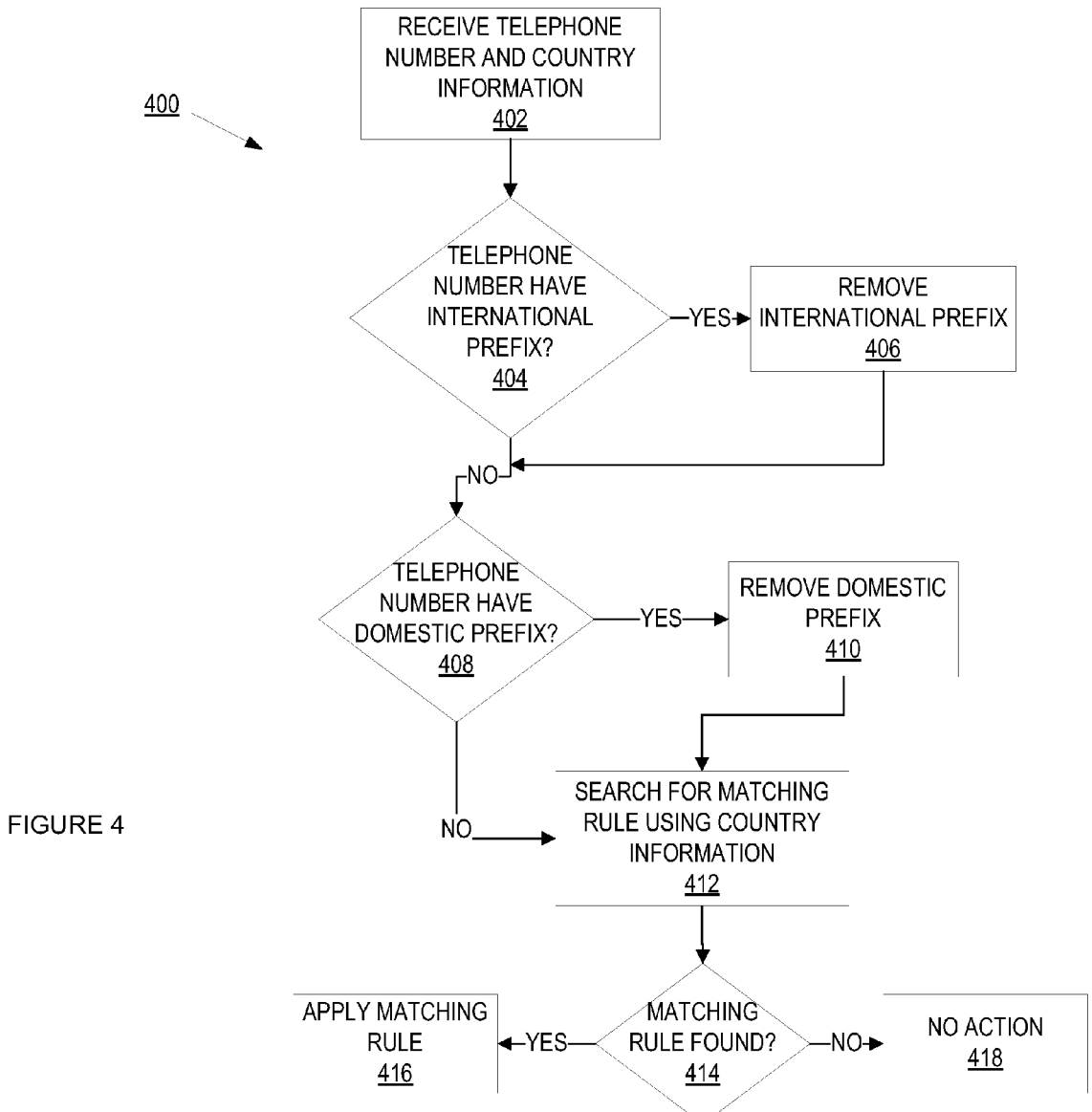
FIG. 4 is a flow diagram of one embodiment of a process to perform international assist for a telephone call.

FIG. 4 is a flow diagram of one embodiment of a process 400 to perform international assist for a telephone call. In one embodiment, process 400 performs international assist as described above in FIG. 3 at blocks 316 or 330. In FIG. 4, process 400 begins by receiving the telephone number and associated country information at block 402. At block 404, process 400 determines if the telephone number has an international prefix. In one embodiment, process 400 determines if the telephone number has an international prefix by inspecting the first 1-3 characters of the telephone number and determining if these characters match a recognized international prefix. For example and in one embodiment, the telephone number "011 33 7 11223344" includes an international prefix because "011" is recognized as an international prefix. In another embodiment, the telephone number "0 7 11223344" does not include an international prefix because there is not an international prefix with a "7" as the second character. If the telephone number includes an international prefix, at block 406, process 400 removes the international prefix. For example and in one embodiment, if the telephone number was "011 33 7 11223344," process 400 would convert the telephone number to "33 7 11223344." When an international prefix is encountered and removed, process 400 looks for a country code immediately following the found international prefix. Process 400 additionally removes this country code, and process 400 processes the remaining number (e.g., searching for the matching pattern) knowing that the pattern must be for the country is indicated by the country code. Process 400 proceeds to block 408 below.

At block 408, process 400 determines if the telephone number has a domestic prefix. In one embodiment, process 400 determines if the telephone number has a domestic prefix by inspecting the first characters of the telephone number and determining if this character matches a recognized domestic prefix. For example and in one embodiment, a domestic prefix is a "0" or "1" at the beginning of the telephone number. For example and in one embodiment, the telephone number "0 7 11223344" includes a domestic prefix, because the leading character is a "0." If the telephone number includes a domestic prefix, process 400 removes the domestic prefix from the telephone number. For example and in one embodiment, if the telephone number was "0 7 11223344," process 400 would convert the telephone number to "7 11223344." Process 400 proceeds to block 412 below. If there is no domestic prefix, process 400 proceeds to block 412 below.

At block 412, process 400 searches for a matching rule that can be used to process the telephone number. In one embodiment, process 400 uses the country information received at block 402 to select a set of formatting rules that are particular to that country. In one embodiment, each of these rules will define a pattern of characters that is used to determine if the telephone number matches this pattern. The pattern may be composed of a number of characters for the pattern and a range of valid number at each character position. For example and in one embodiment, a pattern may define nine characters in the pattern with a number range of 0-1 for the first character, and a number range of 0-9 for character positions 1-8. In another embodiment, the pattern can have a variable number of characters in the pattern. This is used to support countries with varying length local numbers or area codes.

If the telephone number matches the pattern, process 400 determines that the telephone number matches the rule at block 414. In one embodiment, process 400 determines a rules match by matching the first character in the telephone number to the first character position in the pattern. Furthermore, some patterns make take precedence over other patterns for that country. For example and in one embodiment, a pattern for an emergency number (e.g., "911"), would take precedence over a pattern for a typical local number plus area code.

If process 400 finds a matching rule at block 414, at block 416, process 400 applies the action associated with the matching rule. In one embodiment, process 400 prepends the international prefix and country code associated with the matching rule to the telephone number received at block 402. For example and in one embodiment, by identifying "7 11223344" as an area code and local number for a French telephone, process 400 prepends the international prefix and country code for France to give a telephone number as "011 33 7 11223344." If process 400 does not find a matching rule, at block 418, process 400 performs no action of the telephone number.

Figure 5:
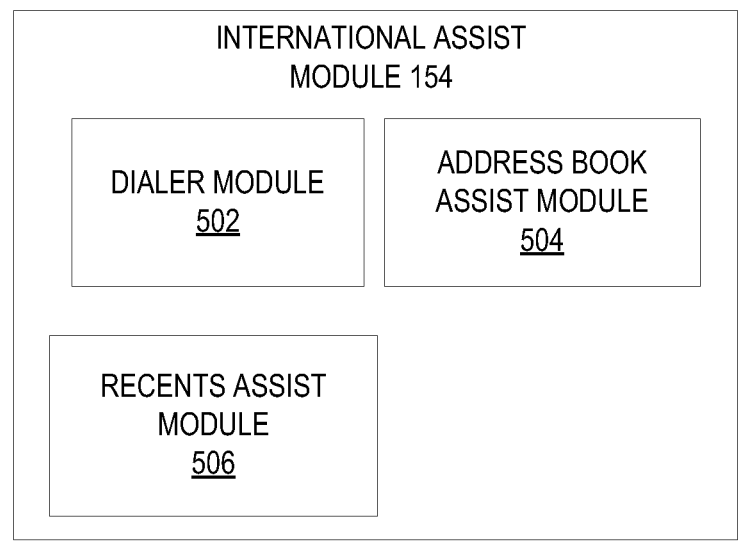
FIG. 5 is a block diagram of one embodiment of an international assist module to perform international assist in making international telephone calls.

FIG. 5 is a block diagram of one embodiment of an international assist module 154 to perform international assist in making international telephone calls. In one embodiment, international assist module 154 includes dialer module 502, address book assist module 504, and recents assist module 506. Dialer module 502 processes telephone numbers received from a dialer as described in FIG. 3, blocks 302-304 above. Address book assist module 504 processes telephone numbers received from an address book entry or telephone URL as described in FIG. 3, blocks 306-316 above. Recents assist module 506 processes telephone numbers received from a Recents list entry as described in FIG. 3, blocks 308-316 and 318-330 above.

Figure 6:
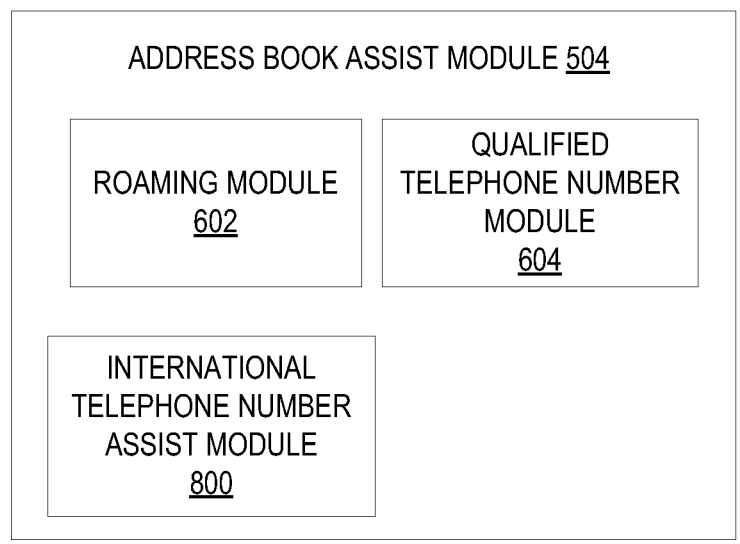
FIG. 6 is a block diagram of one embodiment of an address book assist module to perform international assist in making international telephone calls using an address book entry.

FIG. 6 is a block diagram of one embodiment of an address book assist module 504 to perform international assist in making international telephone calls using an address book entry or telephone URL. In one embodiment, address book assist module 504 includes roaming module 602, qualified telephone number module 604, and international telephone number assist module 800. Roaming module 602 determines if the telephone is roaming as described above in FIG. 3, block 308 above. Qualified telephone number module 604 determines if the telephone number is a fully qualified telephone number as described above in FIG. 3, block 312 above. International telephone number assist module 800 performs international assist using the telephone country information as described above in FIG. 3, block 316 above.

Figure 7:
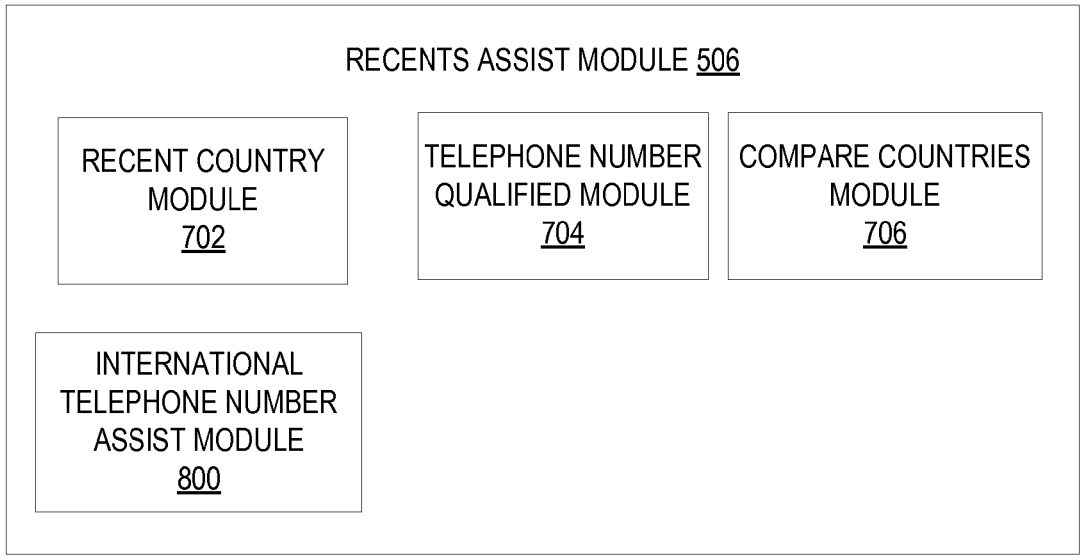
FIG. 7 is a block diagram of one embodiment of a recents assist module to perform international assist in making international telephone calls using a recent list entry.

FIG. 7 is a block diagram of one embodiment of a recents assist module 506 to perform international assist in making international telephone calls using a recent list entry. In one embodiment, recents assist module 506 includes recent country module 702, telephone number qualified module 704, compare countries module 706, and international telephone number assist module 800. Recent country module 702 determines if the Recents list entry has associated country information as described above in FIG. 3, block 320 above. Telephone number qualified module 704 determines if the telephone number is a fully qualified telephone number as described above in FIG. 3, block 322 above. Compare countries module 706 compares the country information as described above in FIG. 3, block 326 above. International telephone number assist module 800 performs international assist using the recents country information as described above in FIG. 3, block 330 above.

Figure 8:
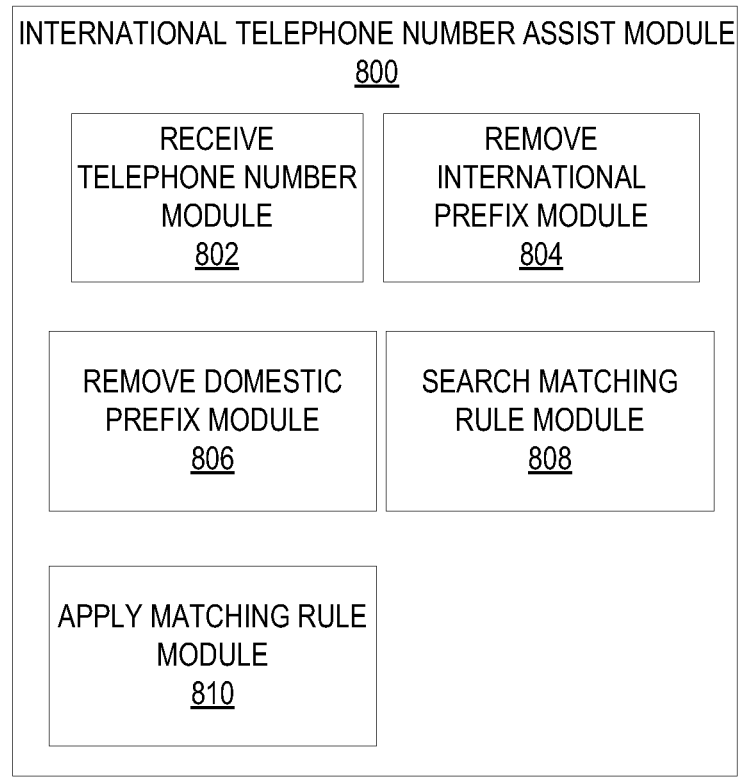
FIG. 8 is a block diagram of one embodiment of an international telephone number assist module to perform international assist in making international telephone calls.

FIG. 8 is a block diagram of one embodiment of an international telephone number assist module 800 to perform international assist in making international telephone calls. In one embodiment, international telephone number assist module 800 includes receive telephone number module 802, remove international prefix module 804, remove domestic prefix module 806, search matching rule module 808, and apply matching rule module 810. Receive telephone number module 802 receives the telephone number as described in FIG. 4, block 402 above. Remove international prefix module 804 removes the international prefix as described in FIG. 4, block 406 above. Remove domestic prefix module 806 removes the domestic prefix as described in FIG. 4, block 410 above. Search matching rule module 808 searches for a matching rule as described in FIG. 4, block 412 above. Apply matching rule module 810 applies the matching rule action as described in FIG. 4, block 416 above.

Figure 9:
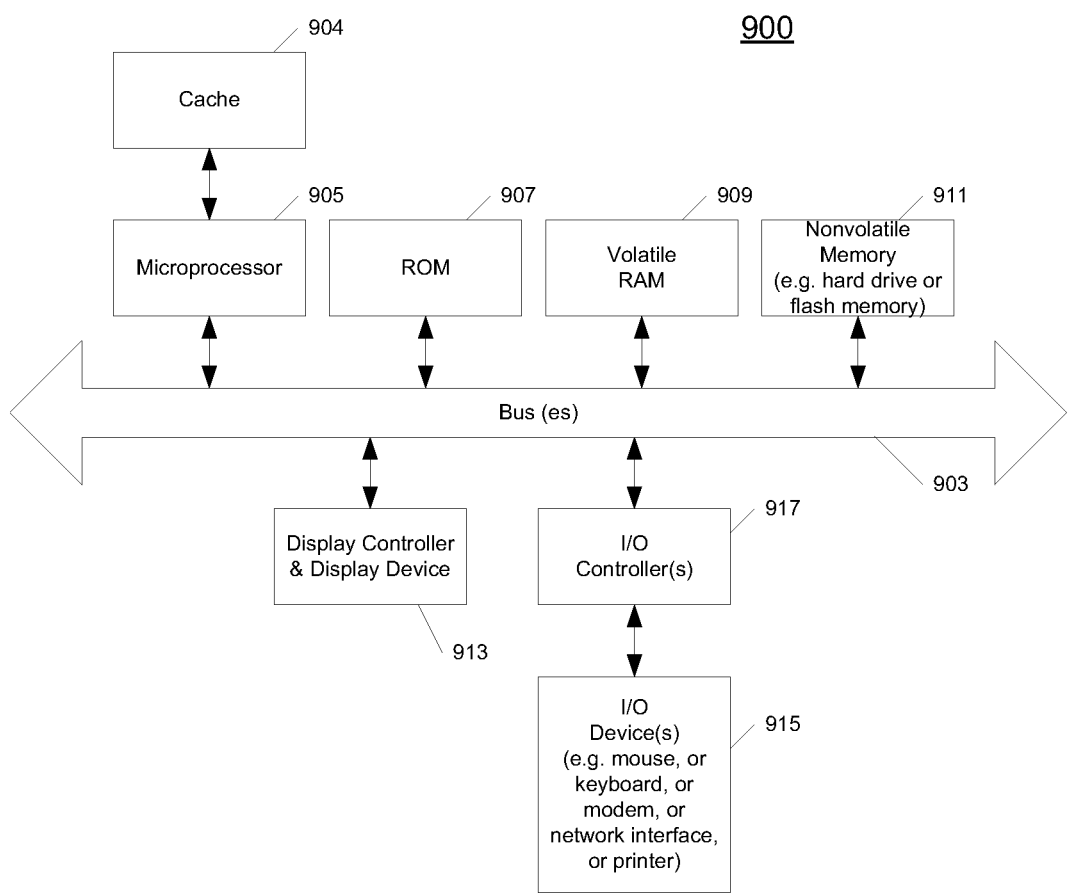
FIG. 9 illustrates one example of a typical computer system, which may be used in conjunction with the embodiments described herein.

FIG. 9 shows one example of a data processing system 900, which may be used with one embodiment of the present invention. For example, the system 900 may be implemented including a telephone 102 as shown in FIG. 1. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 9, the computer system 900, which is a form of a data processing system, includes a bus 903 which is coupled to a microprocessor(s) 905 and a ROM (Read Only Memory) 907 and volatile RAM 909 and a non-volatile memory 911. The microprocessor 905 may retrieve the instructions from the memories 907, 909, 911 and execute the instructions to perform operations described above. The bus 903 interconnects these various components together and also interconnects these components 905, 907, 909, and 911 to a display controller and display device 913 and to peripheral devices such as input/output (I/O) devices which may be mice, keyboards, modems, network interfaces, printers and other devices which are well known in the art. Typically, the input/output devices 915 are coupled to the system through input/output controllers 917. The volatile RAM (Random Access Memory) 909 is typically implemented as dynamic RAM (DRAM), which requires power continually in order to refresh or maintain the data in the memory.

The mass storage 911 is typically a magnetic hard drive or a magnetic optical drive or an optical drive or a DVD RAM or a flash memory or other types of memory systems, which maintain data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

Figure 10:
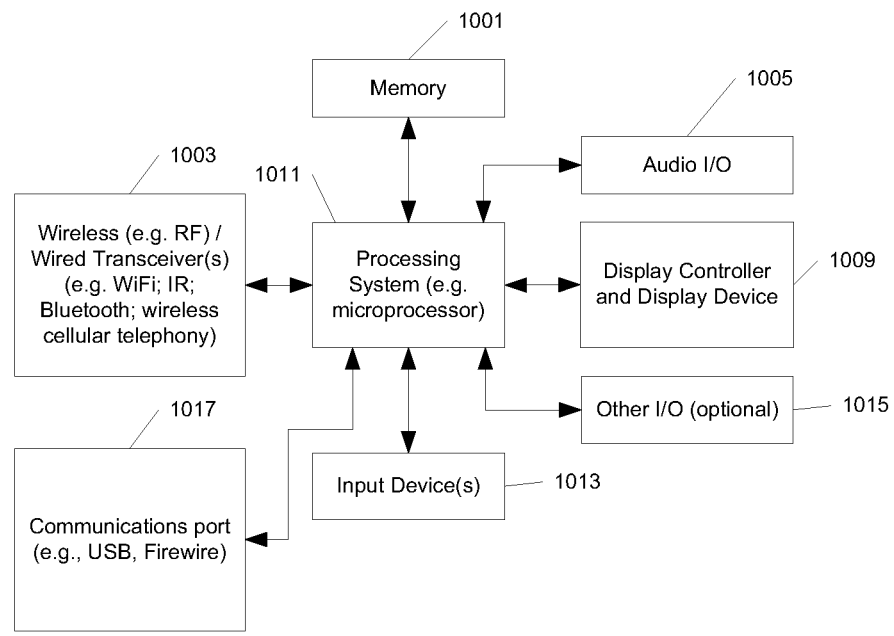
FIG. 10 shows an example of a data processing system, which may be used with one embodiment of the present invention.

FIG. 10 shows an example of another data processing system 1000 which may be used with one embodiment of the present invention. For example, system 1000 may be implemented as a device 102A-B as shown in FIG. 1. The data processing system 1000 shown in FIG. 10 includes a processing system 1011, which may be one or more microprocessors, or which may be a system on a chip integrated circuit, and the system also includes memory 1001 for storing data and programs for execution by the processing system. The system 1000 also includes an audio input/output subsystem 1005, which may include a microphone and a speaker for, for example, playing back music or providing telephone functionality through the speaker and microphone.

A display controller and display device 1009 provide a visual user interface for the user; this digital interface may include a graphical user interface which is similar to that shown on a Macintosh computer when running OS X operating system software, or Apple iPhone when running the iOS operating system, etc. The system 1000 also includes one or more wireless transceivers 1003 to communicate with another data processing system, such as the system 1000 of FIG. 10. A wireless transceiver may be a WLAN transceiver, an infrared transceiver, a Bluetooth transceiver, and/or a wireless cellular telephony transceiver. It will be appreciated that additional components, not shown, may also be part of the system 1000 in certain embodiments, and in certain embodiments fewer components than shown in FIG. 10 may also be used in a data processing system. The system 1000 further includes one or more communications ports 1017 to communicate with another data processing system, such as the system 1500 of FIG. 15. The communications port may be a USB port, Firewire port, Bluetooth interface, etc.

The data processing system 1000 also includes one or more input devices 1013, which are provided to allow a user to provide input to the system. These input devices may be a keypad or a keyboard or a touch panel or a multi touch panel. The data processing system 1000 also includes an optional input/output device 1015 which may be a connector for a dock. It will be appreciated that one or more buses, not shown, may be used to interconnect the various components as is well known in the art. The data processing system shown in FIG. 10 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1000 may be a network computer or an embedded processing device within another device, or other types of data processing systems, which have fewer components or perhaps more components than that shown in FIG. 10.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "receiving," "converting," "transmitting," "identifying," "placing," "storing," "inserting," "transferring", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method of processing a stored telephone number, the method comprising:
   receiving a selection of the stored telephone number, the stored telephone number to be used to place a telephone call on a telephone;
   retrieving the stored telephone number;
   analyzing the stored telephone number to determine a content of the stored telephone number;
   determining a location of the telephone;
   determining if the stored telephone number is in a format to place the telephone call based on the content of the stored telephone number and the determined location of the telephone; and
   if the stored telephone number is not in the format to place the telephone call, converting the stored telephone number to a converted telephone number suitable in the format to place the telephone call from the determined location of the telephone, wherein converting the stored telephone number comprises:
      if the stored telephone number includes a first international prefix, removing the first international prefix from the stored telephone number;
      if the stored telephone number includes a first domestic prefix, removing the first domestic prefix from the stored telephone number;
      determining a matching rule for the stored telephone number based on the determined location of the telephone; and
      applying the matching rule to the stored telephone number,
      wherein if the format to place the telephone call includes a second international prefix, applying the matching rule includes adding the second international prefix to the stored telephone number, and
      wherein if the format to place the telephone call includes a second domestic prefix, applying the matching rule includes adding the second domestic prefix to the stored telephone number.

2. The non-transitory machine-readable medium of claim 1, wherein the converted telephone number in the format to place the telephone call is a fully qualified telephone number.

3. The non-transitory machine-readable medium of claim 2, wherein the fully qualified telephone number includes the second international prefix, a country code, an area code, and a local number.

4. The non-transitory machine-readable medium of claim 1, further comprising:
   initiating the telephone call using the converted telephone number.

5. The non-transitory machine-readable medium of claim 1, wherein the stored telephone number is not a fully qualified telephone number.

6. The non-transitory machine-readable medium of claim 1, wherein the matching rule is a formatting rule that is particular to the determined location of the telephone.

7. The non-transitory machine-readable medium of claim 1, wherein the stored telephone number is selected from the group consisting of a recents list entry, an address book entry, and a telephone Uniform Resource Locator (URL).

8. The non-transitory machine-readable medium of claim 1, wherein the location of the telephone is country information that is stored in the telephone.

9. The non-transitory machine-readable medium of claim 1, wherein the location of the telephone is based on the current carrier of the telephone.

10. A non-transitory machine-readable medium having executable instructions to cause one or more processing units to perform a method of processing a stored telephone number, the method comprising:
receiving a selection of the stored telephone number, the stored telephone number to be used to place a telephone call on a telephone;
retrieving the stored telephone number;
analyzing the stored telephone number to determine a content of the stored telephone number, wherein the content includes a first international prefix and a first country code;
determining a location of the telephone;
determining that the stored telephone number is not in a format to place the telephone call based on the content of the stored telephone number and the determined location of the telephone;
removing the first international prefix and the first country code from the stored telephone number;
determining a matching rule for the stored telephone number based on the determined location of the telephone; and
applying the matching rule to the stored telephone number to create a converted telephone number that is in the format to place the telephone call from the determined location of the telephone, wherein applying the matching rule includes adding a second international prefix and a second country code to the stored telephone number.

11. The non-transitory machine-readable medium of claim 10, wherein the matching rule is a formatting rule that is particular to the determined location of the telephone.

12. The non-transitory machine-readable medium of claim 10, wherein the stored telephone number is selected from the group consisting of a recents list entry, an address book entry, and a telephone Uniform Resource Locator (URL).

13. The non-transitory machine-readable medium of claim 10, wherein the location of the telephone is country information that is stored in the telephone.

14. The non-transitory machine-readable medium of claim 10, wherein the location of the telephone is based on the current carrier of the telephone.

15. An apparatus comprising:
means for receiving a selection of a stored telephone number, the stored telephone number to be used to place a telephone call on a telephone;
means for retrieving the stored telephone number;
means for analyzing the stored telephone number to determine a content of the stored telephone number;
means for determining a location of the telephone;
means for determining if the stored telephone number in a format to place the telephone call based on the content of the input telephone number and the determined location of the telephone; and
if the stored telephone number is not in the format to place the telephone call,
means for converting the stored telephone number to a converted telephone number in the format to place the telephone call from the determined location of the telephone, wherein the means for converting the stored telephone number comprises:
if the stored telephone number includes an international prefix, means for removing the international prefix from the stored telephone number;
if the stored telephone number includes a domestic prefix, means for removing the domestic prefix from the stored telephone number;
means for determining a matching rule for the stored telephone number based on the determined locations of the telephone; and
means for applying the matching rule to the stored telephone number,
wherein if the format to place the telephone call includes a second international prefix, the means for applying the matching rule includes means for adding the second international prefix to the stored telephone number, and
wherein if the format to place the telephone call includes a second domestic prefix, the means for applying the matching rule includes means for adding the second domestic prefix to the stored telephone number.

16. The apparatus of claim 15, wherein the converted telephone number in the format to place the telephone call is a fully qualified telephone number.

17. The apparatus of claim 16, wherein the fully qualified telephone number includes the second international prefix, a country code, an area code, and a local number.

18. The non-transitory machine-readable medium of claim 1, wherein if the stored telephone number includes a first country code, converting the stored telephone number further comprises:
removing the first country code from the stored telephone number.

19. The non-transitory machine-readable medium of claim 18, wherein if the format to place the telephone call includes a second country code, applying the matching rule includes adding the second country code to the stored telephone number.

* * * * *

UNITED STATES PATENT AND TRADEMARK OFFICE
CERTIFICATE OF CORRECTION

Page 1 of 1

PATENT NO. : 8,838,078 B2
APPLICATION NO. : 13/225204
DATED : September 16, 2014
INVENTOR(S) : Joshua H. Shaffer and Jeremy Thomas Brown It is certified that error appears in the above-identified patent and that said Letters Patent is hereby corrected as shown below:

In the claims please make the correction as shown below:

Column 14, Line 26, Claim 1: please delete "suitable".

Signed and Sealed this
Ninth Day of December, 2014

Michelle K. Lee
*Deputy Director of the United States Patent and Trademark Office*